US012780963B2

(12) United States Patent
Verdejo Márquez et al.

(10) Patent No.: US 12,780,963 B2
(45) Date of Patent: Nov. 3, 2026

(54) FIBRE-REINFORCED POLYMERS BASED ON THERMOPLASTIC MATRICES

(71) Applicant: CONSEJO SUPERIOR DE INVESTIGACIONES CIENTIFICAS (CSIC), Madrid (ES)

(72) Inventors: Raquel Verdejo Márquez, Madrid (ES); Miguel Ángel López Manchado, Madrid (ES); Alberto Santiago Bethencourt, Madrid (ES)

(73) Assignee: CONSEJO SUPERIOR DE INVESTIGACIONES CIENTIFICAS (CSIC), Madrid (ES)

( * ) Notice: Subject to any disclaimer, the term of this patent is extended or adjusted under 35 U.S.C. 154(b) by 771 days.

(21) Appl. No.: 18/032,079

(22) PCT Filed: Oct. 14, 2021

(86) PCT No.: PCT/ES2021/070751
§ 371 (c)(1),
(2) Date: Jun. 12, 2023

(87) PCT Pub. No.: WO2022/079336
PCT Pub. Date: Apr. 21, 2022

(65) Prior Publication Data

US 2023/0383028 A1 Nov. 30, 2023

(30) Foreign Application Priority Data

Oct. 15, 2020 (ES) ................................ ES202031042

(51) Int. Cl.
*C08J 5/24* (2006.01)
*C08F 120/14* (2006.01)
*C08L 33/08* (2006.01)
*C08L 33/10* (2006.01)
*C08L 33/12* (2006.01)

(52) U.S. Cl.
CPC ............. *C08F 120/14* (2013.01); *C08J 5/243* (2021.05); *C08J 2333/12* (2013.01)

(58) Field of Classification Search
None
See application file for complete search history.

(56) References Cited

U.S. PATENT DOCUMENTS 5,747,553 A * 5/1998 Guzauskas ............ C08F 287/00 524/556
2003/0181612 A1* 9/2003 Kawasaki ............. C08F 212/34 526/228
2018/0179105 A1 6/2018 Gerard

FOREIGN PATENT DOCUMENTS

WO 2017095893 A1 6/2017

OTHER PUBLICATIONS

Quentin Charlier, Jean-Charles Fontainer, Frederic Lortie, Jean-Pierre Pascault, Jean-Francois Gerard, "Rheokinetic Study of Acrylic Reactive Mixtures Dedicated to Fast Processing of Fiber-Reinforced Thermoplastic Composites", Article, 2019, 1-9, vol. 136, No. 47391, Journal of Applied Polymer Science.
M.E. Kazemi, Logesh Shanmugam, Dong Lu, Xiaogang Wang, Bowei Wang, Jinglei Yang, Mechanical Properties and Failure Modes of Hybrid Fiber Reinforced Polymer Composites with a Novel Liquid Thermoplastic Resin, Elium, Article, Jul. 9, 2019, 1-12, vol. 125, No. 105523, Composites Part A.
S.T. Balke and A.E. Hamielec, "Bulk Polymerization of Methyl Methacrylate", Manuscript, 1973, 905-949, vol. 17, Journal of Applied Polymer Science.

* cited by examiner

*Primary Examiner* — Michael J Feely
(74) *Attorney, Agent, or Firm* — Ladas & Parry LLP

(57) ABSTRACT

The present invention relates to the production of fibre-reinforced polymer (FRP) composite materials based on thermoplastic matrices (fibre-reinforced thermoplastic or FRTP), in liquid state, which allow the pre-impregnated materials to be stored at 10-15° C. without the material polymerising, for more than six months.

14 Claims, 2 Drawing Sheets

FIBRE-REINFORCED POLYMERS BASED ON THERMOPLASTIC MATRICES

CROSS-REFERENCE TO RELATED APPLICATIONS AND PRIORITY

This patent application claims priority from PCT Application No. PCT/ES2021/070751 filed Oct. 14, 2021, which claims priority from Spanish Patent Application No. P202031042 filed Oct. 15, 2020. Each of these patent applications are herein incorporated by reference in their entirety.

DESCRIPTION

The present invention relates to the production of fibre-reinforced polymer (FRP) composite materials based on thermoplastic matrices (fibre-reinforced thermoplastic or FRTP), in liquid state, which allow the pre-impregnated materials to be stored at 10-15° C. without the material polymerising, for more than six months.

BACKGROUND OF THE INVENTION

Fibre-reinforced polymer composites (FRP) materials consist of high-strength, high-modulus fibres bonded by a polymer matrix. These materials exhibit, among other characteristics, excellent mechanical properties superior to those of conventional materials with high resistance to fatigue and corrosion, good dimensional stability, in addition to being very light. Therefore, these materials are becoming increasingly important as structural materials in a wide sector of applications such as the aeronautical industry, aerospace industry, automotive industry, wind industry, among others.

At present, these materials are made of long or continuous unidirectional or woven fibre, and a thermosetting matrix. The main drawback of these materials is that once the matrix cures, a large number of chemical crosslinks are formed, giving rise to an irreversible three-dimensional network. In other words, these materials cannot be transformed or thermoformed again, and it further hinders the recycling thereof. To try to solve this problem, there is an enormous interest in developing FRPs based on thermoplastic matrices (fibre-reinforced thermoplastic or FRTP). These polymers do allow the material to be reprocessed at temperatures above its melting point. However, most advances in this field have been limited to the use of short fibres since conventional thermoplastic matrix transformation techniques, such as extrusion and injection, do not allow long fibres to be incorporated. The properties of short fibre-reinforced composite materials are inferior to those achieved with long fibres. Today, long fibre tapes with thermoplastic matrix are commercially available, but for their processing, high temperatures are required to melt the matrix. It is a complex process and more expensive than with thermosetting matrices, as it requires more expensive infrastructure and techniques.

It is therefore necessary to develop FRTPs that can be processed by the conventional techniques used to develop FRPs with a thermosetting matrix. To that end, it is necessary to use thermoplastic matrices in a liquid state with low viscosity which allow the impregnation of the fibres and subsequently polymerise on application of temperature. In recent years, Arkema has developed a family of thermoplastic resins called Elium® resins, based on acrylic matrices, specifically a methyl methacrylate which polymerises in the presence of a peroxide-type catalyst. This resin has been shown to readily impregnate the fibres using the same transformation techniques used with thermosetting resins. Arkema has produced composite materials with long glass or carbon fibres with good mechanical characteristics, which can be thermoformed on application of temperature.

However, the main drawback of this system is that the polymerisation between the resin and the peroxide is carried out by means of very exothermic redox reactions and that it occurs practically immediately, which limits the working time (gel time).

DESCRIPTION OF THE INVENTION

Taking into account the prior art and the problems identified, in the present invention, an acrylic resin has been developed by means of a bulk polymerisation reaction with thermal initiation with peroxides.

In this manner, the polymerisation between the acrylic monomer and the initiator is a less exothermic and more controlled reaction, does not occur immediately, and it is possible to store the mixture at temperatures between 10-15° C. without the material polymerising, making it easier to work with. The resin is prepared in a wide range of viscosities comprised between 100 and 1100 cP, so it can be used in any FRP transform technique, such as hand contact moulding, pultrusion, filament winding, resin infusion, laminate compression moulding (SMC) or resin transfer moulding (RTM). Furthermore, it is possible to prepare prepregs in which the fibre is impregnated with the uncured resin. The prepregs that are currently marketed with thermosetting resins have to be kept at very low temperatures, −20° C., so that the resin does not cure. With this new thermoplastic resin, it would be possible to store the prepregs at 10-15° C. without the material polymerising, which represents significant cost savings.

Furthermore, another advantage is that at the end of its useful life, it is possible to separate and recover the fibres and the resin by simple treatment with mild solvents such as acetone.

Therefore, the present invention has developed a series of new thermoplastic (acrylic) resins which can be polymerised by means of a bulk polymerisation reaction with thermal initiation with peroxides, which allows said polymerisation reaction between the acrylic monomer and the initiator to be a less exothermic and more controlled reaction than those described to date.

Furthermore, as mentioned above, this reaction does not occur immediately and it is possible to store the mixture at temperatures between 10-15° C. without the material polymerising for more than six months.

Therefore, in a first aspect, the invention relates to a method for obtaining a thermoplastic acrylic resin comprising the following steps:

a) bulk polymerisation by thermal initiation at a temperature comprised between 60 and 100° C. between a monomer selected from ethyl methacrylate, methyl methacrylate, isopropyl methacrylate, t-butyl methacrylate, butyl methacrylate, ethylene acrylate, hydroxyethyl methacrylate, and trimethylolpropane triacrylate, or any combinations thereof, and a radical initiator selected from benzoyl peroxide, methyl ethyl ketone peroxide, cumyl hydroperoxide, and azobisisobutyronitrile, at a percentage comprised between 0.5 and 5%;

b) milling of the polymer obtained in step a) until reaching a particle size comprised between 20 and 100 μm;

c) dilution of the polymer from step b) with its corresponding monomer until reaching a dynamic viscosity comprised between 100 and 1100 cP measured in a Brookfield viscometer at 20° C. and with a rotor speed of 200 rpm;

d) dilution of the same radical initiator used in step a) in the dilution obtained in step c) at room temperature and until reaching a percentage of initiator comprised between 0.5 and 3%.

In a preferred embodiment, the monomer of step a) is methyl methacrylate.

In another preferred embodiment, the concentration of the radical initiator of step a) is between 0.5 and 5% by weight, and more preferably it is 3% by weight.

In another preferred embodiment, the radical initiator of step a) is benzoyl peroxide.

In another preferred embodiment, the thermal initiation of step a) takes place at a temperature of 70° C.

In another preferred embodiment, the ratio in dilution step c) between the polymer from step a) and its corresponding monomer is between 90:10 and 70:30 monomer:polymer; more preferably, the monomer:polymer ratio is 75:25.

More preferably, when the monomer in step a) is methyl methacrylate, obtaining PMMA in the polymerisation, and the dilution monomer of step c) is methyl methacrylate (MMA), the MMA:PMMA ratio is 75:25.

In another preferred embodiment, the method comprises an additional step of curing the resin from step d) at a temperature comprised between 60 and 100° C.

In a second aspect, the present invention relates to a polymeric thermoplastic acrylic resin obtained according to the method of the invention described above, and characterised by presenting a dynamic viscosity comprised between 100 and 1100 cP.

This range of viscosities is marketed by Arkema in its acrylic resin. However, the difference with the resin of the invention resides in the gel time or the time it takes for the resin to increase its viscosity. While with Arkema's resin it occurs in about 10 minutes at room temperature, the system of the invention can remain for more than two days without polymerising at room temperature. On the other hand, the resin-initiator mixture of the invention can be stored between 10-15° C. for more than 6 months without polymerising, which is not possible with Arkema's resin.

A third aspect of the invention relates to the use of the polymeric thermoplastic acrylic resin, obtained according to the method of the invention as described above, in the preparation of prepregs which can be stored at 10-15° C. for more than 6 months without polymerising, characterised in that it comprises a fibrous material and the polymeric thermoplastic acrylic resin obtained according to the method of the invention as described above.

Another aspect of the present invention relates to a prepreg, characterised in that it comprises a fibrous material and the polymeric thermoplastic acrylic resin obtained according to the method of the invention as described above.

In a preferred embodiment, the fibrous material is selected from carbon fibre, glass fibre, aramid fibre, and natural fibres, among others.

An additional aspect of the invention relates to the use of polymeric thermoplastic acrylic resin, obtained according to the method of the invention as described above, in the preparation of polymeric composite materials.

Another additional aspect of the present invention relates to a polymeric composite material obtained by polymerisation or curing, at a temperature equal to or greater than 60° C., of the polymeric thermoplastic acrylic resin of the invention, as described above, in the presence of a fibrous material.

A final aspect of the invention relates to the use of the prepreg and/or the polymeric composite material as described above in the manufacture, for example, of wind turbine blades, automotive parts, boats, sports equipment, construction, among others.

In the present invention, the term "prepreg" refers to the composition comprising the polymeric thermoplastic acrylic resin of the invention together with a fibrous material selected from carbon fibre, glass fibre, aramid fibre, and natural fibres, among others. This composition allows the fibrous material to be stored together with the uncured resin at a temperature between 10-15° C. without the material polymerising for more than six months, which represents a considerable improvement compared to the prepregs that are currently commercialised with thermosetting resins, which must be kept at very low temperatures (−20° C.) so that the resin does not cure, with the industrial and economic advantages that this entails.

Throughout the description and the claims, the word "comprises" and its variants do not intend to exclude other technical features, additives, components or steps. For those skilled in the art, other objects, advantages and features of the invention may be partially deduced from both the description and the embodiment of the invention. The following examples and figures are provided by way of illustration and are not intended to limit the present invention.

EXAMPLES

Next, the invention will be illustrated by means of test carried out by the inventors that demonstrate the effectiveness of the product of the invention.

Example 1. Polymerisation of Methyl Methacrylate (MMA) Monomer in the Presence of Radical Initiators The polymerisation of the methyl methacrylate (MMA) monomer was carried out through a bulk thermal initiation reaction in the presence of peroxide-type radical initiators or azo compounds. In this study, different peroxides such as benzoyl peroxide (BP), methyl ethyl ketone peroxide (MEKP), cumyl hydroperoxide (CHP), as well as the compound azobisisobutyronitrile (AIBN).

To optimise the minimum polymerisation time and temperature of these initiators, a fixed amount of 5 g of MMA mixed with 3% by weight of initiator was selected.

The samples were immersed in a silicone bath at the desired temperature, controlled by a heating plate which allowed the transmission of homogeneous heat throughout the entire bath. The optimal temperatures and times for each initiator are listed in Table 1.

TABLE 1

Optimal times and temperatures for the polymerisation of MMA with different initiators

| Initiator | Temperature (° C.) | Time (minutes) |
|---|---|---|
| AIBN | 60 | 40 |
| PB | 70 | 90 |
| MEKP | 90 | 90 |
| CHP | 100 | 60 |

Figure 1:
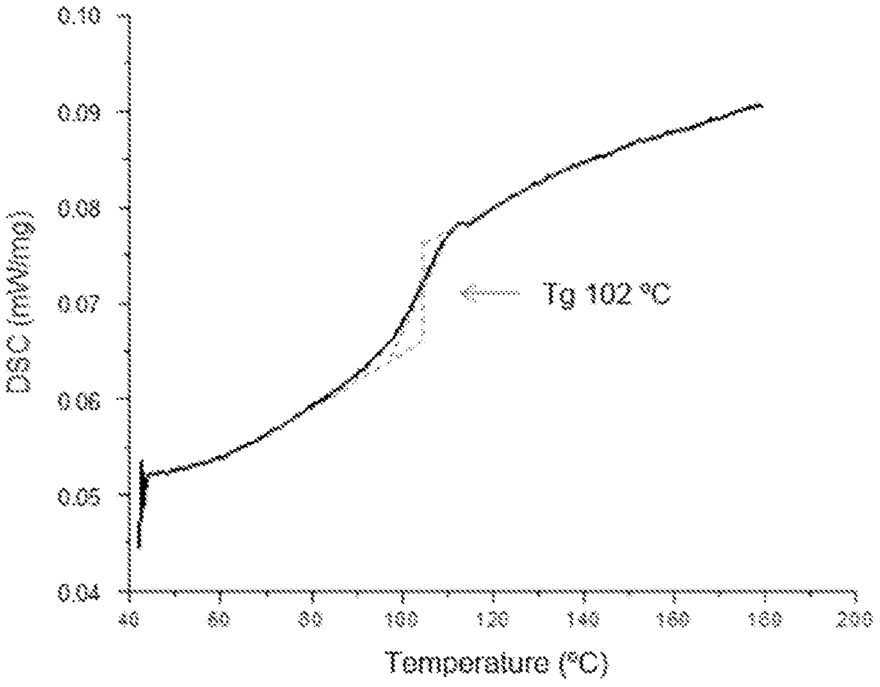
FIG. 1. PMMA DSC curve. Thermogram obtained under dynamic conditions in a temperature range of 40° C. to 180° C. at a heating rate of 2° C./min by differential scanning calorimetry (DSC).

The polymerised MMA (PMMA) was characterised to determine its glass transition temperature (Tg) and molecular weight. FIG. 1 shows the thermogram obtained under dynamic conditions in a temperature range of 40° C. to 180° C. at a heating rate of 2° C./min by Differential Scanning Calorimetry (DSC). PMMA shows a Tg of 102° C.

Example 2. Resin Viscosity Characterisation

The viscosity of the resin is a key aspect for its use in the production of composite materials with fibres, since it has to flow easily and impregnate the fibres. Depending on the transformation technique used for the production of composite materials, the viscosity of the resin should be in the range of about 100 to 1100 cP. The viscosity of the resin, a mixture of MMA and 3% BP, measured in a Brookfield viscometer at 20° C. and with a rotor speed of 200 rpm is 0.62 cP.

To raise the viscosity above 100 cP, PMMA, which was previously polymerised and milled by cryomilling in a liquid nitrogen cooled ball mill with in a single 2-minute cycle at a frequency of 30 $s^{-1}$ until reaching a particle size of between 20 and 100 microns, with the MMA monomer at different concentrations and kept under gentle mechanical stirring for a minimum of 48 hours to ensure complete and homogeneous dilution.

In this way, the viscosity of the resin is controlled in a viscosity range comprised between 100 and 1100 cP, that is, optimal viscosities for the production of fibre-reinforced composite materials by any of the transformation techniques used on an industrial scale.

Table 2 indicates the viscosity values of the systems based on the percentage of polymer diluted in the monomer, where it can be seen that the viscosity of the system increases progressively with the polymer concentration in the mixture.

TABLE 2

Resin viscosity values based on MMA concentration

| % MMA | 100 | 85 | 80 | 75 | 70 |
|---|---|---|---|---|---|
| Viscosity (cP) | 0.6 | 72.6 | 154.2 | 378.5 | 1085 |

For viscosity values, the resin with a 75:25 MMA:PMMA ratio was selected, although the methods are equally valid for any of the ratios studied.

Example 3. Optimisation of the Curing Reaction Parameters

Another key aspect is to control the conditions of the curing reaction (temperature and time). To that end, a study of the effect of the concentration of the radical initiator that was previously used (benzoyl peroxide, BP) and the reaction temperature on the curing time of the resin obtained in Example 1 was carried out, using an initiator concentration range of between 0.5 and 3% by weight with respect to the resin, and a curing temperature range of between 60 and 80° C.

It can be observed that the curing decreases as the percentage of initiator in the resin increases and as the curing temperature increases (Table 3).

TABLE 3

Curing time (in minutes) of the resin based on BP concentration and the curing temperature

| % BP | 60° C. | 70° C. | 80° C. |
|---|---|---|---|
| 0.5 | 300 | 80 | 33 |
| 1 | 130 | 40 | 28 |
| 2 | 65 | 35 | 24 |
| 3 | 60 | 35 | 20 |

Furthermore, the effect of these factors, that is, the percentage of initiator and the curing temperature, on the Tg of the resin was studied in a DSC following the protocol described above (Table 4). It can be observed that the Tg decreases progressively as the initiator concentration increases and there is no clear trend with the curing temperature.

TABLE 4

Glass transition temperature of the resin based on initiator content and curing temperature

| | Tg (° C.) | | | |
|---|---|---|---|---|
| Curing temperature | 0.5% BP | 1% BP | 2% BP | 3% BP |
| 60° C. | 105.0 | 103.6 | 100.1 | 93.6 |
| 70° C. | 107.3 | 106.4 | 102.2 | 99.5 |
| 80° C. | 100.7 | 93.1 | 105.0 | 103.6 |

Example 4. Stability of the Resin-Initiator Mixture

A fundamental aspect when working with a resin at an industrial level is to control the gel time, in other words, the time necessary for the resin to start curing and increase its viscosity. It is a measure of the time available to work with the resin. This MMA:PMMA/initiator system does not polymerise at room temperature for up to 7 days, unlike the commercial resin from Arkema which, on adding the initiator, produces a strongly exothermic reaction, polymerising the resin in a few minutes at room temperature.

Furthermore, the resin developed in this invention can be stored at a temperature between 10-15° C. without polymerising for more than 6 months.

Figure 2:
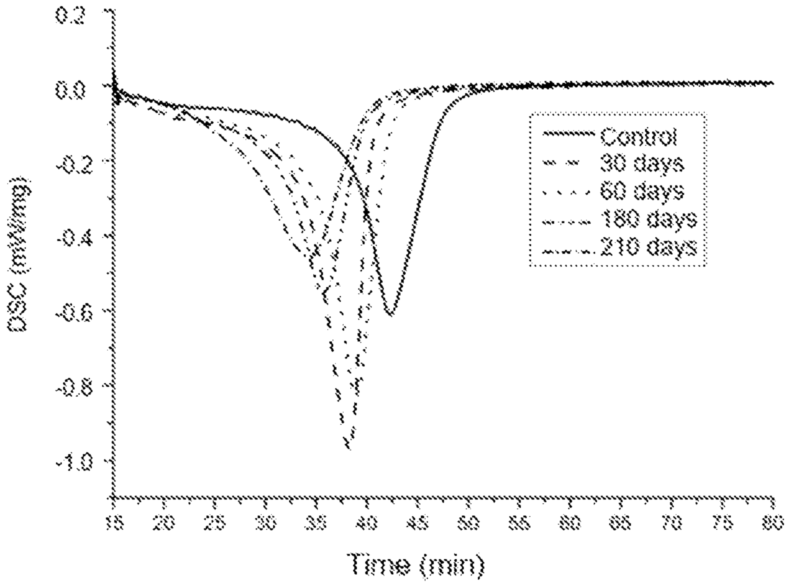
FIG. 2. Curing curves of the resin at different storage times.

The study of the stability of the resin over time was carried out through differential scanning calorimetry (DSC) tests, under isothermal conditions at 70° C. for 2 hours in a nitrogen atmosphere, to simulate curing conditions at an industrial level. The resin is stored at 10° C. and aliquots are taken at different times, 30, 60, 180 and 210 days from the preparation (control sample) (FIG. 2). The curing reaction is an exothermic reaction and the peak represents the time needed for the curing reaction to occur. It can be observed that as the storage time of the resin increases, the curing reaction starts earlier and requires less time. This is because the resin-initiator mixture is still somewhat reactive, so polymerisation starts a few minutes earlier as there are more free radicals.

However, this change is quite insignificant, there being a difference in polymerisation start times of just 8 minutes between the sample stored for 210 days (7 months) and the control sample (0 days). It can be concluded that the storage of the resin at 10° C. is viable, since it slows down the inherent reactivity of the resin enough to maintain the useful life of the resin for more than 6 months.

Example 5. Preparation of Carbon-Fibre Reinforced Composite Materials

Laminates with 4 layers of unidirectional carbon fibre with a dimension of 12×12 cm were prepared by means of vacuum assisted resin infusion (VARI) moulding. Once the fibre is perfectly impregnated by the resin/initiator mixture, the piece is cured by applying a temperature of 70° C. for 2 hours, maintaining a vacuum to achieve optimal compaction between the different sheets making up the composite material.

Example 6. Preparation of Prepregs and Stability

The resin developed in this invention allows the preparation of extremely cost-effective prepregs, fibres pre-impregnated with the uncured resin/initiator mixture. At present, commercial thermosetting resin prepregs need to be stored below −20° C. to prevent curing, which makes this type of material more expensive. The prepregs developed in this invention can be kept at 10° C. for 6 months without polymerising, which represents considerable financial savings. Pre-impregnation can be performed manually or by means of using impregnation equipment at room temperature and removing excess resin using a roller system. The proportion of resin in these prepregs is between 30% and 35% by weight.

Example 7. Thermoforming of the Carbon-Fibre Reinforced Composite Material of the Invention One of the main advantages of using thermoplastic matrices for the manufacture of fibre-reinforced composite materials is that it can be thermoformed, unlike those prepared with thermoset resins which are impossible to reprocess. This characteristic does not depend on the size of the part or the number of layers. This size will only influence optimal conditions of temperature, time and/or pressure to carry out thermoforming.

Figure 3:
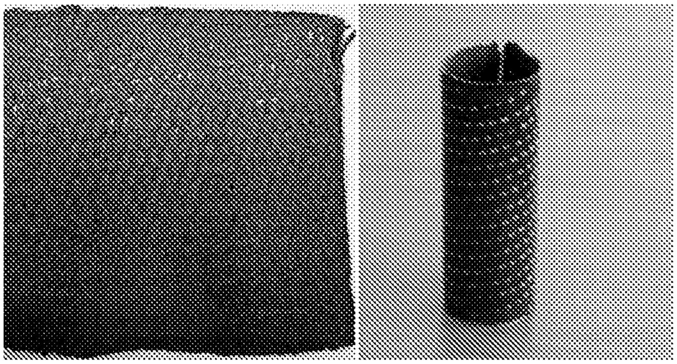
FIG. 3. Original shape of the laminate and after moulding at 110° C.

The laminate prepared in Example 5 is thermoformed with the application of a temperature above the Tg of the polymer, around 110° C., and slight pressure for 5 minutes, adapting different geometric shapes that consolidate when cooled (FIG. 3).

Example 8. Recycling of Fibres from the Composite Material of the Invention

Figure 4:
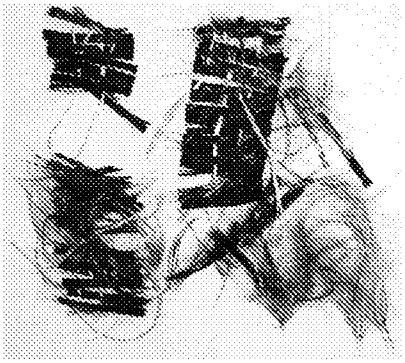
FIG. 4. Carbon fibre recovered after immersing the laminate in acetone.

Conventional fibre-reinforced composite materials with thermoset matrices cannot be recycled and the only way to recover the fibre, that is, the major and most expensive component of the composite material, is by means of complicated combustion processes at high temperatures, above 600° C., which also causes damage to the surface of the fibres. However, by using the thermoplastic resin designed in this invention, it is possible to recover the fibres by simple dilution of the matrix in a solvent. To verify this, laminates have been immersed in different organic solvents, such as tetrahydrofuran, chloroform, acetone, toluene or dichloromethane, for two days, with the fibre being easily recovered in optimal conditions (FIG. 4). About 95% of the resin impregnated in the fibre is removed. The extracted polymer from the composite is separated from the solvent by means of a rotary evaporator at room temperature.

The invention claimed is:

1. A method for obtaining a thermoplastic acrylic resin composition comprising the following steps:

a) polymerizing at least one monomer through a bulk thermal initiation reaction in the presence of a radical initiator and at a temperature between 6° and 100° C., wherein the at least one monomer is selected from the group consisting of ethyl methacrylate, methyl methacrylate, isopropyl methacrylate, t-butyl methacrylate, butyl methacrylate, ethylene acrylate, hydroxyethyl methacrylate, and trimethylolpropane triacrylate, and wherein the radical initiator is selected from the group consisting of benzoyl peroxide, methyl ethyl ketone peroxide, cumyl hydroperoxide, and azobisisobutyronitrile;

b) milling of the polymer obtained in step a) until reaching a particle size between 20 and 100 μm; and c) diluting the milled polymer from step b) with the at least one monomer until reaching a dynamic viscosity between 100 and 1100 cP to produce the thermoplastic acrylic resin composition, wherein the dynamic viscosity is measured in a Brookfield viscometer at 20° C. and with a rotor speed of 200 rpm; and wherein the radical initiator is present in the thermoplastic acrylic resin composition at a concentration between 0.5 and 3% by weight with respect to the thermoplastic acrylic resin composition.

2. The method according to claim 1, wherein the at least one monomer is methyl methacrylate.

3. The method according to claim 1, wherein the radical initiator is present in the thermoplastic acrylic resin composition at a concentration of 1% by weight with respect to the thermoplastic acrylic resin composition.

4. The method according to claim 1, wherein the radical initiator is present in the thermoplastic acrylic resin composition at a concentration of 2% by weight with respect to the thermoplastic acrylic resin composition.

5. The method according to claim 1, wherein the radical initiator is benzoyl peroxide.

6. The method according to claim 1, wherein the thermal initiation takes place at a temperature of 70° C.

7. The method according to claim 1, wherein the milled polymer is diluted with the at least one monomer in step c, such that a weight ratio of the at least one monomer to the milled polymer is between 90:10 and 70:30.

8. The method according to claim 7, wherein the weight ratio is 75:25.

9. A method of obtaining a cured thermoplastic acrylic resin comprising preparing a thermoplastic acrylic resin composition according to the method of claim 1 and curing the thermoplastic acrylic resin composition at a temperature between 6° and 100° C.

10. A thermoplastic acrylic resin composition produced by the method of claim 1, wherein the thermoplastic acrylic resin composition is capable of being stored at a temperature of 10 to 15° C., without polymerizing, for more than six months.

11. A prepreg, comprising a fibrous material impregnated with the thermoplastic acrylic resin composition according to claim 10.

12. The prepreg according to claim 11, wherein the fibrous material is selected from the group consisting of carbon fibre, glass fibre, aramid fibre, and natural fibres.

13. A polymeric composite material obtained by curing the thermoplastic acrylic resin composition according to claim 10 at a temperature equal to or greater than 60° C. in the presence of a fibrous material.

14. The composite material according to claim 13, wherein the fibrous material is selected from the group consisting of carbon fibre, glass fibre, aramid fibre, and natural fibres.

* * * * *